United States Patent
O'Dell et al.

(10) Patent No.: US 8,929,008 B1
(45) Date of Patent: Jan. 6, 2015

(54) SYSTEMS AND METHODS FOR TESTING MAGNETIC MEDIA DISKS DURING MANUFACTURING USING SLIDERS WITH TEMPERATURE SENSORS

(71) Applicant: WD Media, LLC, San Jose, CA (US)

(72) Inventors: Thomas A. O'Dell, Sunnyvale, CA (US); Balvinder Singh, Gilroy, CA (US)

(73) Assignee: WD Media, LLC, San Jose, CA (US)

( * ) Notice: Subject to any disclaimer, the term of this patent is extended or adjusted under 35 U.S.C. 154(b) by 0 days.

(21) Appl. No.: 13/928,206

(22) Filed: Jun. 26, 2013

Related U.S. Application Data

(60) Provisional application No. 61/785,263, filed on Mar. 14, 2013.

(51) Int. Cl.
  *G11B 5/02* (2006.01)
  *G11B 20/18* (2006.01)
(52) U.S. Cl.
  CPC .................. *G11B 20/1816* (2013.01)
  USPC ............ 360/25; 360/76; 360/234.4; 360/294; 360/135
(58) Field of Classification Search
  None
  See application file for complete search history.

(56) References Cited

U.S. PATENT DOCUMENTS

| | | | |
|---|---|---|---|
| 6,355,300 B1 | 3/2002 | Stirniman et al. | |
| 6,853,508 B2 | 2/2005 | Smith et al. | |
| 7,609,473 B1 | 10/2009 | Mate | |
| 7,724,461 B1 | 5/2010 | McFadyen et al. | |
| 7,724,463 B2 | 5/2010 | Nakamura et al. | |
| 8,068,306 B2 | 11/2011 | Ramamoorthy et al. | |
| 2005/0286150 A1 | 12/2005 | Baumgart et al. | |
| 2007/0248749 A1 | 10/2007 | Guo et al. | |
| 2008/0247095 A1* | 10/2008 | Kim et al. | 360/313 |
| 2009/0195912 A1 | 8/2009 | Sato | |
| 2010/0021773 A1 | 1/2010 | Reiter | |
| 2012/0222276 A1 | 9/2012 | Guo et al. | |

* cited by examiner

*Primary Examiner* — Wayne Young
*Assistant Examiner* — Brian Butcher

(57) ABSTRACT

Systems and methods for testing magnetic media disks during manufacturing using sliders with temperature sensors are provided. One such method involves scanning a surface of a selected disk of a plurality of magnetic media disks using a slider including a magnetic transducer and a temperature sensor, counting a number of the surfaces scanned, determining, during the scanning, whether a threshold crossing event has occurred by determining whether a signal from the temperature sensor signal is not within a preselected range, counting, during the scanning, a number of threshold crossing events, storing, if the number of threshold crossing events is greater than a preselected events limit, the number of surfaces scanned, stopping, if the number of surfaces scanned is greater than a surfaces scanned threshold, the scanning, and returning, if the number of surfaces scanned is less than or equal to the surfaces scanned threshold, to scan a next selected disk.

28 Claims, 3 Drawing Sheets

SYSTEMS AND METHODS FOR TESTING MAGNETIC MEDIA DISKS DURING MANUFACTURING USING SLIDERS WITH TEMPERATURE SENSORS

CROSS-REFERENCE TO RELATED APPLICATION(S)

This application claims priority to and the benefit of U.S. Provisional Application No. 61/785,263, filed on Mar. 14, 2013, entitled, "SYSTEMS AND METHODS FOR TESTING MAGNETIC MEDIA DISKS DURING MANUFACTURING USING SLIDERS WITH TEMPERATURE SENSORS", the entire content of which is incorporated herein by reference.

FIELD

The present invention relates generally to manufacturing magnetic media disks for magnetic recording, and more specifically to systems and methods for testing magnetic media disks during manufacturing using sliders with temperature sensors.

BACKGROUND

Testing systems (e.g., spin stands and/or other suitable test equipment) are used for multiple purposes with respect to hard disk drive (HDD) disks, including disk characterization, testing, and development. Based on the results provided by these testing systems, changes in the manufacture and design of the disks can be made. In particular instances, the testing systems may perform an HDD initialization process that can involve measuring the touch down (TD) behavior of the head (e.g., behavior of the head and the media as the head comes in contact with the media) before and after a sequence of operations. If the touch down behavior changes by more than a certain degree, then the head media interface (e.g., head and media spacing) is determined to be defective and the head and media pair can be considered as a failed component. This type of event can be referred to as a TD delta failure. Preventing media that may be likely to cause a TD delta failure in the HDD from being manufactured or from being supplied to the HDD assembly operations can be important to keeping the total cost of HDD manufacturing under control.

DETAILED DESCRIPTION

Figure 1:
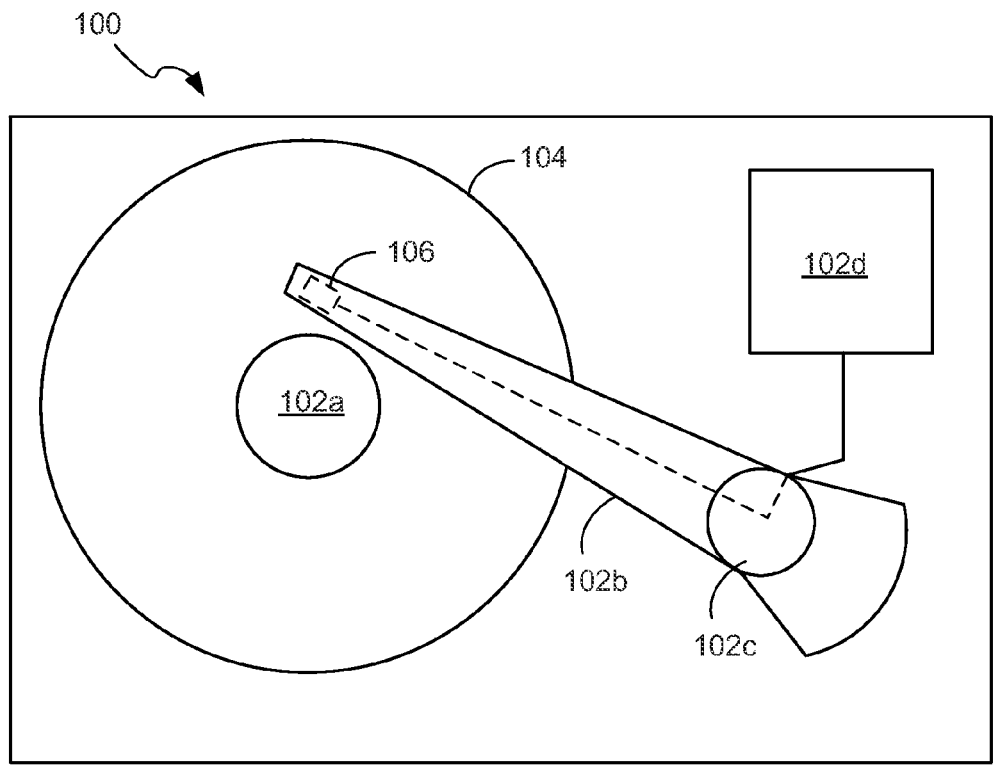
FIG. 1 is a top schematic view of a system for testing magnetic media disks including a tester, a media disk, and a slider with a temperature sensor in accordance with one embodiment of the invention.

As the margins for the media manufacturing processes that determine the media interface quality become smaller, the accuracy of the methods that control the processes need to be improved. Several methods for controlling the media process have been investigated, including low clearance fly tests (LCFT), lube carbon interaction (LCI) tests, and inductively-coupled plasma mass spectrometry (ICP-MS) tests. However, each of these methods has shown limitations for controlling the process. These limitations are addressed using the systems and methods described herein for testing magnetic media disks during manufacturing using sliders with temperature sensors.

The LCFT and ICP-MS processes are extremely low throughput processes and therefore often require a minimum of 24 hours to return the results for a single sample. As a result, these processes are unable to track changes in the manufacturing process that occur during shorter time periods or that have high levels of variation. In contrast, the systems and methods described herein can often perform using less than roughly 2 minutes to scan a 95 millimeter (mm) disk surface, and therefore are able to achieve a much higher sampling rate.

The LCI process is based on the number of occurrences of a particular defect pattern that is most likely caused by contamination on the write head of a particular tone-scan defect detection system. However, this LCI process has shown an inability to correlate with the HDD TD delta behavior. One major weakness of this LCI method is that it does not measure the number of media scans a particular head can sustain before it becomes contaminated, and it is not able to detect a contamination event with high accuracy. In contrast, the systems and methods described herein are able track the scans a particular head can sustain and will detect the contamination event with high accuracy.

Referring now to the drawings, embodiments of systems and methods for testing magnetic media disks during manufacturing using sliders with temperature sensors. These systems and methods include a process for controlling the interface quality of the magnetic media manufacturing process. The media quality can be determined based on measurements using a temperature sensor (which may also be referred to as a touch down sensor or TDS), such as a nano thermistor sensor integrated into a hard disk drive head slider. More specifically, the media quality can be determined based on the number of surfaces the slider can consecutively scan before the signal from the TDS signal (e.g., TDS signal) indicates that the head is no longer able to maintain a stable flying attitude. The number of surface scans that a head can scan before it becomes unstable is a strong function of the lube and contamination build up on the head transferred from the media.

The TDS is able to sense the flying condition of the head because it is able to sense the head to media spacing by thermal coupling. That is, it can detect increases in temperature caused by contact or near contact between the head/slider and the media (or lubrication on the media). The use of the TDS to control the media interface quality at the media manufacturing process can mitigate the problem of having supplied media that later fails in the HDD due to media interface quality problems.

FIG. 1 is a top schematic view of a system 100 for testing magnetic media disks including a tester (102a, 102b, 102c, 102d), a media disk 104, and a slider 106 with a temperature sensor in accordance with one embodiment of the invention. The tester includes a spindle assembly 102a, a suspension arm 102b, an actuator 102c, and control circuitry 102d. The media disk 104 is mounted to the spindle assembly 102a. Data may be stored along tracks in the magnetic recording layer of disk 104.

Figure 2:
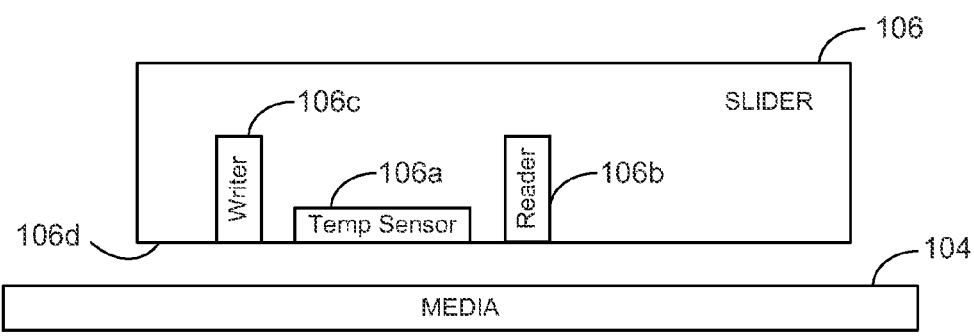
FIG. 2 is a side cross sectional schematic view of the media disk and the slider with the temperature sensor of FIG. 1 in accordance with one embodiment of the invention.

FIG. 2 is a side cross sectional schematic view of the media disk 104 and the slider 106 with the temperature sensor 106a of FIG. 1 in accordance with one embodiment of the invention. Referring now to both FIG. 1 and FIG. 2, the reading and writing of data is accomplished with the slider/head 106 that has both a reader 106b and a writer 106c along with the temperature sensor (e.g., a nano thermistor sensor) 106a which is integrated along an air bearing surface 106d of the slider 106. In other embodiments, the temperature sensor 106a can be positioned in other suitable locations along or within the slider 106. The writer 106c is used to alter the properties of the magnetic recording layer of disk 104 and thereby write information thereto. In one embodiment, head (106b, 106c) may have magneto-resistive (MR), or giant magneto-resistive (GMR) elements. In an alternative embodiment, head may be another type of head, for example, an inductive read/write head or a Hall effect head.

In operation, a spindle motor (not shown) rotates the spindle assembly 102a, and thereby rotates disk 104 to position head 106 at a particular location along a desired disk track. The actuator 102c rotates suspension arm 102b and head 106 laterally to position head 106 at particular tracks along the surface of the disk 104. The position of head 106 relative to disk 104 may be controlled by control circuitry 102d, which can effectively control all of the other tester components.

In several embodiments, the tester is configured to scan a media surface of a selected media disk (e.g., disk 104) of a number of media disks using the slider 106, count a number of the media surfaces of the magnetic media disks that have been scanned, determine during the scan whether a threshold crossing event has occurred during the scans by determining whether a signal from the temperature sensor is not within a preselected threshold temperature range, and count the number of the threshold crossing events during a preselected time period. In some embodiments, the preselected threshold temperature range is a range from 0 to a preselected threshold temperature such that the threshold crossing events occurs whenever a reading indicative of the signal from the temperature sensor is greater than the preselected threshold temperature. In some other embodiments, the preselected threshold temperature range is a range from the preselected threshold temperature to infinity such that the threshold crossing events occurs whenever a reading indicative of the signal from the temperature sensor is less than the preselected threshold temperature.

If the number of threshold crossing events is greater than a preselected crossing events limit, the tester is further configured to store the number of the media surfaces that have been scanned. If the number of threshold crossing events is greater than a media surfaces scanned threshold, the tester is further configured to stop the scan of the media surfaces. Alternatively, if the number of threshold crossing events is less than or equal to the media surfaces scanned threshold, the tester is configured to continue scanning additional media disks.

Processes that can be used to operate the tester of FIGS. 1 and 2 are discussed in greater detail below. In some embodiments, the tester is further configured to provide, if the number of the media surfaces scanned is less than a preselected media surfaces minimum count for a single slider, a notice for modifying a manufacturing process for the media disks.

In several embodiments, the tester is further configured to repeat the media scanning for a number of sliders and count the sliders tested. In such case, the tester is further configured to provide, if an average number of the media surfaces scanned for the sliders is less than a preselected media surfaces minimum average count for the sliders, a notice for modifying a manufacturing process for the plurality of magnetic media disks. The notices can precipitate appropriate changes in the media processes.

In a number of embodiments, the tester is further configured to calibrate, prior to scanning the media surface of the selected media disk, a head fly height of the slider using the temperature sensor. In one such case, tester is configured to obtain, during the calibration of the head fly height of the slider using the temperature sensor, a signal indicative of a surface topography of the selected media disk, where the preselected threshold temperature range corresponds to the signal indicative of the surface topography. In some embodiments, the tester calibrates the head fly height by adjusting the nominal spacing between the slider/head and the media by using a dynamic fly (height) heater or DFH disposed in the slider. For example, during the calibration, the temperature sensor is forced toward the media, a touch down or near touch down occurs, and the slider is backed off of the media. In such case, the temperature at touch down can be determined. In addition, a noise level of the head media pair can be determined. In several embodiments, process parameters such as the preselected threshold temperature range, the number of the preselected crossing events limit, and the media surfaces scanned threshold are each based on information, such as the noise level and/or touch down temperature, obtained during the calibration of the head fly height.

In one embodiment, the tester is further configured to initialize, prior to scanning the media surface of the selected media disk, the number of media surfaces scanned for the slider to 0. In several embodiments, the tester uses the temperature sensor to indirectly measure a contamination of the slider. In one embodiment, the temperature sensor is configured to effectively measure a flying attitude of the slider.

In one embodiment, the preselected threshold temperature range is in a range from about 1 degree Celsius less than an operating temperature of the temperature sensor (e.g., about 100 degrees Celsius) to about 1 degree Celsius greater than the operating temperature of the temperature sensor. In one embodiment, the number of the preselected crossing events limit is in a range from about 50 to about 150. In one embodiment, the media surfaces scanned threshold is in a range from about 900 to about 1100. In one embodiment, the preselected time period is in a range from about 4 milliseconds to about 8 milliseconds. In other embodiments, these process parameters can have other suitable values.

In several embodiments, the tester effectively executes a process for controlling a media manufacturing operation with respect to the quality of the media interface. In this context, the particular quality of the media interface that is measured is the ability for a head to scan the media and remain free from contamination that is transferred (i.e. picked up) from the media. The head contamination condition is measured indirectly by the heads ability to fly stable and the head flying attitude is directly measured by the temperature sensor (e.g., a touch down sensor or TDS) in the head/slider.

The signal from the TDS or TDS signal can be processed using a band pass filter, which may be implemented in hardware or software, with a frequency response from about 10 kHz to about 500 kHz and the number of threshold crossings that occur during a media revolution are recorded. If the number of counts exceeds a preselected crossing events limit called TCOUNTS then a TDS oscillation or TOSC event is said to have occurred during the scan. The band pass filter can be optimized to detect head fly height oscillation. In one embodiment, the TOSC channel is unique because it does not operate in the frequency range for conventional defect detection systems which typically operate using a higher frequency response from about 1 MHz to 50 MHz.

The control circuitry 102*d* can be implemented with various components such as a processor and memory to store information including real-time temperature information and calibration information. In this context, the processor refers to any machine or selection of logic that is capable of executing a sequence of instructions and should be taken to include, but not limited to, general purpose microprocessors, special purpose microprocessors, central processing units (CPUs), digital signal processors (DSPs), application specific integrated circuits (ASICs), signal processors, microcontrollers, and other suitable circuitry. Further, it should be appreciated that the term processor, microprocessor, circuitry, controller, and the like, refer to any type of logic or circuitry capable of executing logic, commands, instructions, software, firmware, functionality, and the like.

The tester can be a standard disk testing machine such as a spin stand, a tester, a defect scanning system, a certifier, or another suitable type of magnetic disk testing machine known in the art.

Figure 3:
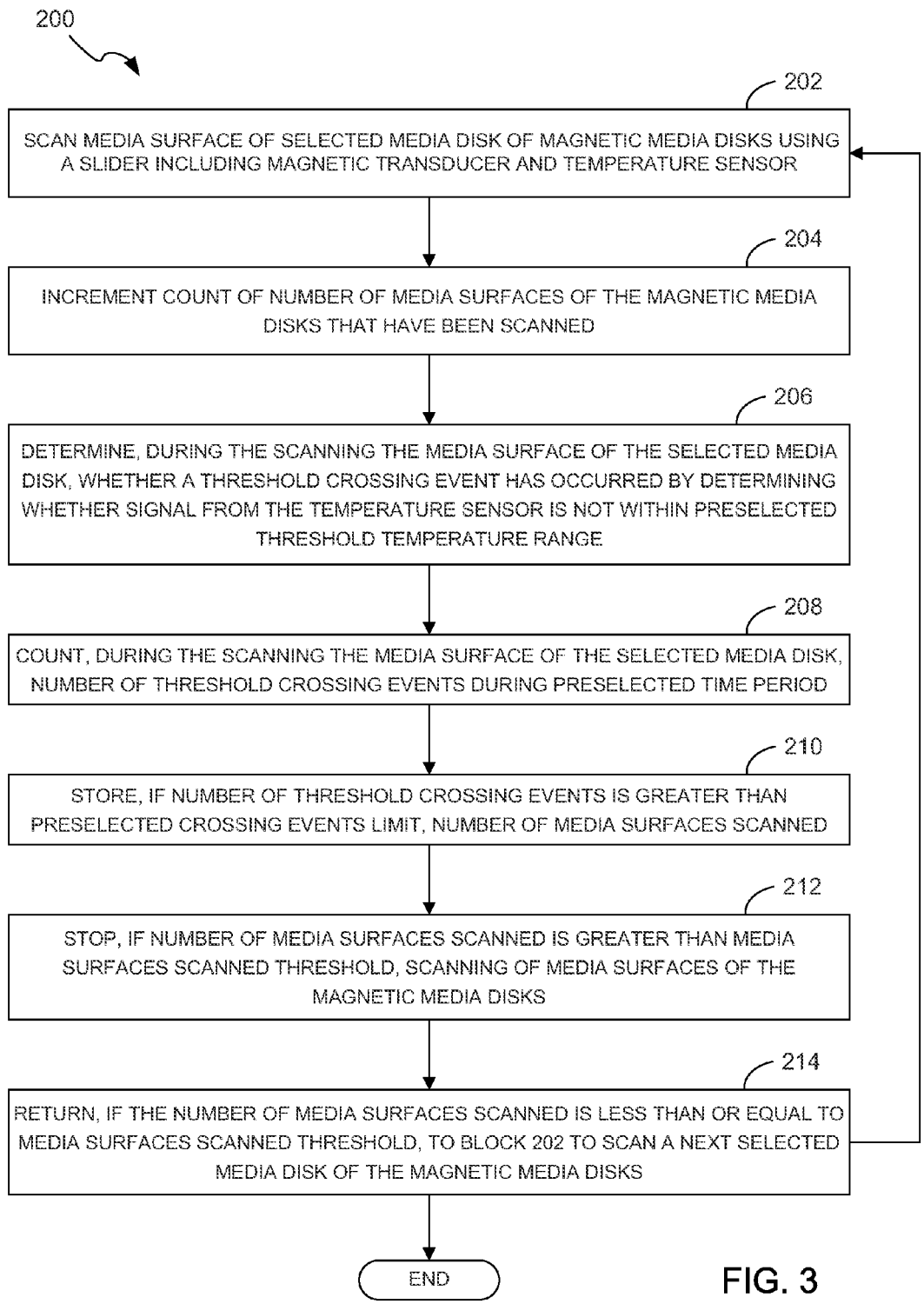
FIG. 3 is a flowchart of a process for testing magnetic media disks during manufacturing using a tester and a slider with a temperature sensor in accordance with one embodiment of the invention.

FIG. 3 is a flowchart of a process 200 for testing magnetic media disks during manufacturing using a tester and a slider with a temperature sensor in accordance with one embodiment of the invention. In particular embodiments, the process 200 can be performed by the tester of FIG. 1, and more specifically, by the control circuitry 102*d*. The process first scans (202) a media surface of a selected media disk of a plurality of magnetic media disks using a slider including a magnetic transducer and a temperature sensor. The process then increments (204) a count of the number of media surfaces of the plurality of magnetic media disks that have been scanned. The process then determines (206), during the scanning of the media surface of the selected media disk, whether a threshold crossing event has occurred by determining whether a signal from the temperature sensor is not within a preselected threshold temperature range. The process counts (208), during the scanning of the media surface of the selected media disk, the number of the threshold crossing events during a preselected time period.

The process stores (210), if the number of threshold crossing events is greater than a preselected crossing events limit, the number of media surfaces scanned. The process stops (212), if the number of threshold crossing events is greater than a media surfaces scanned threshold, the scanning of the media surfaces of the plurality of magnetic media disks. The process then returns (214), if the number of media surfaces scanned is less than or equal to the media surfaces scanned threshold, to block 202 to scan a next selected media disk of the plurality of magnetic media disks.

In some embodiments, the process also modifies, if the number of the media surfaces scanned is less than a preselected media surfaces minimum count for a single slider, a manufacturing process for the plurality of magnetic media disks. In some embodiments, the process repeats blocks 202 to 214 for a number of sliders and counts the number of sliders tested. In one such embodiment, the process modifies, if an average number of the media surfaces scanned for the sliders is less than a preselected media surfaces minimum average count for the sliders, a manufacturing process for the plurality of magnetic media disks.

In several embodiments, the scanning the media surface of the selected media disk in block 202 includes first calibrating a head fly height of the slider using the temperature sensor. In one such case, the preselected threshold temperature range, the number of the preselected crossing events limit, and the media surfaces scanned threshold are each based on information, such as touch down temperature and/or noise level, obtained during the calibration of the head fly height. For example, in another such case, the process obtains, during the calibrating the head fly height of the slider using the temperature sensor, a signal indicative of a surface topography of the selected media disk, where the preselected threshold temperature range is calculated such that it corresponds to the signal indicative of the surface topography.

In some embodiments, the scanning the media surface of the selected media disk in block 202 includes first initializing the number of media surfaces scanned for the slider to 0. In one embodiment, the preselected threshold temperature range is in a range from about 1 degree Celsius less than an operating temperature of the temperature sensor to about 1 degree Celsius greater than the operating temperature of the temperature sensor, where the number of the preselected crossing events limit is in a range from about 50 to about 150, and where the media surfaces scanned threshold is in a range from about 900 to about 1100. In one embodiment, the preselected time period is in a range from about 4 milliseconds to about 8 milliseconds. In other embodiments, other suitable values for these process parameters can be used.

In several embodiments, the exact process control limits (e.g., threshold crossing event, preselected threshold temperature range, preselected crossing events limit, media surfaces scanned threshold, etc.) that will generate a media quality alarm are flexible and can be determined by correlation with the HDD TD delta behavior, as described in more detail above.

In one embodiment, the process 200 can perform the sequence of actions in a different order. In another embodiment, the process can skip one or more of the actions. In other embodiments, one or more of the actions are performed simultaneously. In some embodiments, additional actions can be performed.

Figure 4:
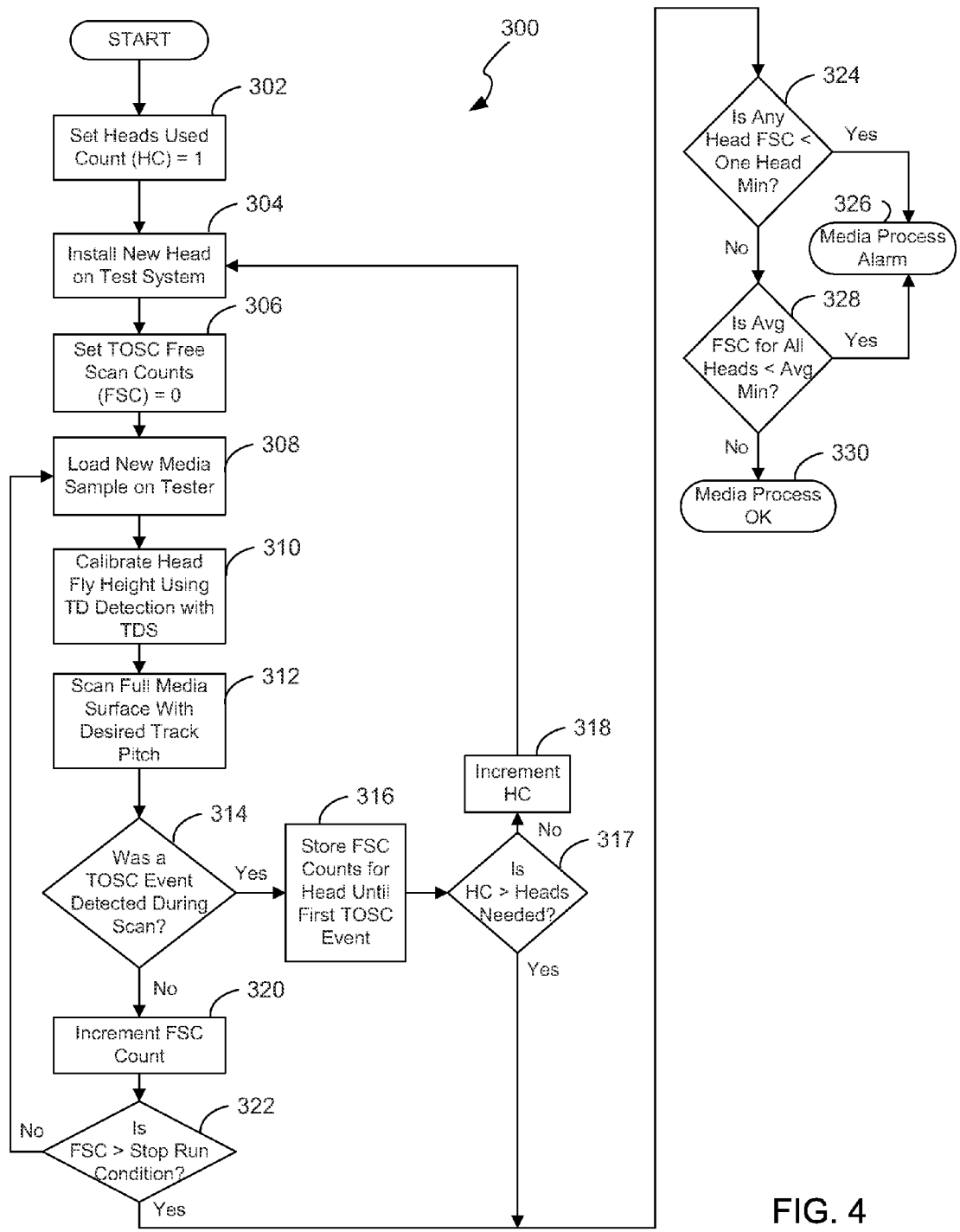
FIG. 4 is a flowchart of another process for testing magnetic media disks during manufacturing using a tester and a slider with a temperature sensor in accordance with one embodiment of the invention.

FIG. 4 is a flowchart of another process 300 for testing magnetic media disks during manufacturing using a tester and a slider with a temperature sensor in accordance with one embodiment of the invention. In particular embodiments, the process 300 can be performed by the tester of FIG. 1, and more specifically, by the control circuitry. The process first sets (302) a head count (HC) equal to 1. The process then installs (304) a new head/slider on the test system (e.g., tester). The process then sets (306) a TD oscillator (TOSC) free scan count or FSC (e.g., media surface count) equal to 0. The process then loads (308) a new media/disk sample on to the tester. The process then calibrates (310) the head fly height using TD detection with the TDS (e.g., temperature sensor). In one embodiment, the calibration involves adjusting the nominal spacing between the head and media using a DFH heater and storing the temperature at which the head contacts the media.

The process then scans (312) the full media surface with a desired track pitch. The process then determines (314) whether a TOSC event (e.g., threshold crossing events were greater than a preselected crossing events limit) was detected during the scan. If so, the process logs/stores (316) the FSC counts for the head until the first TOSC event occurred. From block 316, the process determines (317) whether the head count (HC) is greater than the number of heads desired to be tested. If not, the process increments (318) the head count and returns to block 304. However, if the condition is true in block 317, the process advances to a block 324 to be discussed below.

Returning now to block 314, if the condition in block 314 is not true, then the process increments (320) the FSC count. From block 320, the process determines (322) whether the FSC is greater than a preselected threshold (e.g., run stop condition) such that the media surface count is above some satisfactory number of surfaces expected for a given head. If not, the process returns to block 308 to load new media, or possibly to block 312 to scan another media surface. If the condition of block 322 is true, then the process determines (324) whether the FSC of any one of the heads tested is less than a one head minimum threshold. If so, the process sets (326) a media process alarm and the media manufacturing process may be analyzed and improved. If the condition of block 324 is not true, then the process determines (326) whether the average FSC is less than a preselected minimum average. If so, the process sets (326) the media process alarm and the media manufacturing process may be analyzed and improved. If not, the process ends (330).

In the process illustrated in FIG. 3 a number of process stop conditions are presented. In other embodiments, these process stop conditions can be modified. In addition, the exact process control limits (e.g., threshold crossing event, preselected threshold temperature range, preselected crossing events limit, media surfaces scanned threshold, etc.) that will generate a media quality alarm are flexible and can be determined by correlation with the HDD TD delta behavior and/or application specific requirements.

In one embodiment, the process 300 can perform the sequence of actions in a different order. In another embodiment, the process can skip one or more of the actions. In other embodiments, one or more of the actions are performed simultaneously. In some embodiments, additional actions can be performed.

As has been alluded to above, controlling the media manufacturing interface quality can be very useful. In the case of TD delta failure in the HDD, the minimum cost is often the depopulation of a head/media pair (e.g., where the HDD chooses not to use the non-functional head/media pair) which drives down the total HDD capacity and its value. If the percentage of HDD failures is high enough (e.g., greater than about 15%), it can trigger a media stop ship and media lot hold to the media manufacturing operation. If the questionable media cannot be sorted for the quality problem it will often be either mixed into other media populations at a rate low enough to prevent the HDD stop ship trigger or will likely be scrapped.

Another scenario is the case when there is excessive HDD TD delta failure during the qualification phase for a particular media in a HDD program. In this case, the problem can trigger a media re-design and re-qualification which are lengthy processes (e.g., greater than about 3 months) and may drive the program to use an alternative media supplier temporarily or permanently. When media from the internal media supply cannot be used it causes a higher allotment of media supply to external suppliers which directly increases the cost of the HDD, and underutilizes internal media manufacturing capital equipment and labor overhead.

In one embodiment, a benefit of the present invention is to prevent high levels of TD delta in the HDD from occurring which in turn substantially reduces or prevents the types of negative outcomes just described.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A method for testing magnetic media disks during manufacturing, the method comprising:
   (a) scanning a media surface of a selected media disk of a plurality of magnetic media disks, each having a media surface, using a slider comprising a magnetic transducer and a temperature sensor;
   (b) incrementing a count of a number of the media surfaces of the plurality of magnetic media disks that have been scanned;
   (c) determining, during the scanning of the media surface of the selected media disk, whether a threshold crossing event has occurred by determining whether a signal from the temperature sensor is not within a preselected threshold temperature range;
   (d) counting, during the scanning of the media surface of the selected media disk, a number of the threshold crossing events during a preselected time period;
   (e) storing, if the number of threshold crossing events is greater than a preselected crossing events limit, the number of the media surfaces scanned;
   (f) stopping, if the number of media surfaces scanned is greater than a media surfaces scanned threshold, a scanning of the media surfaces of the plurality of magnetic media disks; and
   (g) returning, if the number of media surfaces scanned is less than or equal to the media surfaces scanned threshold, to (a) to scan a next selected media disk of the plurality of magnetic media disks.

2. The method of claim 1, further comprising modifying, if the number of the media surfaces scanned is less than a preselected media surfaces minimum count for a single slider, a manufacturing process for the plurality of magnetic media disks.

3. The method of claim 1, further comprising:
   repeating (a) to (g) for a plurality of sliders; and
   counting a number of sliders tested.

4. The method of claim 3, further comprising:
   modifying, if an average number of the media surfaces scanned for the sliders is less than a preselected media surfaces minimum average count for the sliders, a manufacturing process for the plurality of magnetic media disks.

5. The method of claim 1:
   wherein the (a) scanning the media surface of the selected media disk of the plurality of magnetic media disks using the slider comprising the magnetic transducer and the temperature sensor comprises:
      calibrating a head fly height of the slider using the temperature sensor; and (a) scanning the media surface of the selected media disk of the plurality of magnetic media disks using the slider comprising the magnetic transducer and the temperature sensor.

6. The method of claim 5:
wherein the preselected threshold temperature range, the number of the preselected crossing events limit, and the media surfaces scanned threshold are each based on information obtained during the calibration of the head fly height.

7. The method of claim 6, further comprising:
obtaining, during the calibrating of the head fly height of the slider using the temperature sensor, a signal indicative of a surface topography of the selected media disk,
wherein the preselected threshold temperature range corresponds to the signal indicative of the surface topography.

8. The method of claim 1:
wherein the (a) scanning the media surface of the selected media disk of the plurality of magnetic media disks using the slider comprising the magnetic transducer and the temperature sensor comprises:
initializing the number of media surfaces scanned for the slider to 0; and
(a) scanning the media surface of the selected media disk of the plurality of magnetic media disks using the slider comprising the magnetic transducer and the temperature sensor.

9. The method of claim 1, wherein the temperature sensor comprises a nano-thermistor stripe sensor.

10. The method of claim 1, wherein the temperature sensor is disposed on an air bearing surface of the slider.

11. The method of claim 1, wherein the temperature sensor is configured to indirectly measure a contamination of the slider.

12. The method of claim 1, wherein the temperature sensor is configured to measure a flying attitude of the slider.

13. The method of claim 1:
wherein the preselected threshold temperature range is in a range from about 1 degree Celsius less than an operating temperature of the temperature sensor to about 1 degree Celsius greater than the operating temperature of the temperature sensor;
wherein the number of the preselected crossing events limit is in a range from about 50 to about 150; and
wherein the media surfaces scanned threshold is in a range from about 900 to about 1100.

14. The method of claim 1, wherein the preselected time period is in a range from about 4 milliseconds to about 8 milliseconds.

15. A system for testing magnetic media disks during manufacturing, the system comprising:
a plurality of magnetic media disks, each having a media surface;
a slider comprising a magnetic transducer and a temperature sensor;
a tester configured to test components of a disk drive including the plurality of magnetic media disks using the slider;
the tester configured to:
(a) scan the media surface of a selected media disk of the plurality of magnetic media disks using the slider;
(b) increment a count of a number of the media surfaces of the plurality of magnetic media disks that have been scanned;
(c) determine, during the scan of the media surface of the selected media disk, whether a threshold crossing event has occurred by determining whether a signal from the temperature sensor is not within a preselected threshold temperature range;
(d) count, during the scan of the media surface of the selected media disk, a number of the threshold crossing events during a preselected time period;
(e) store, if the number of threshold crossing events is greater than a preselected crossing events limit, the number of the media surfaces scanned;
(f) stop, if the number of media surfaces scanned is greater than a media surfaces scanned threshold, a scanning of the media surfaces of the plurality of magnetic media disks; and
(g) return, if the number of media surfaces scanned is less than or equal to the media surfaces scanned threshold, to (a) to scan a next selected media disk of the plurality of magnetic media disks.

16. The system of claim 15, wherein the tester is further configured to:
provide, if the number of the media surfaces scanned is less than a preselected media surfaces minimum count for a single slider, a notice for modifying a manufacturing process for the plurality of magnetic media disks.

17. The system of claim 15, wherein the tester is further configured to:
repeat (a) to (g) for a plurality of sliders; and
count a number of sliders tested.

18. The system of claim 17, wherein the tester is further configured to:
provide, if an average number of the media surfaces scanned for the sliders is less than a preselected media surfaces minimum average count for the sliders, a notice for modifying a manufacturing process for the plurality of magnetic media disks.

19. The system of claim 15, wherein the tester is further configured to:
calibrate, prior to scanning the media surface of the selected media disk, a head fly height of the slider using the temperature sensor.

20. The system of claim 19:
wherein the preselected threshold temperature range, the number of the preselected crossing events limit, and the media surfaces scanned threshold are each based on information obtained during the calibration of the head fly height.

21. The system of claim 20, wherein the tester is further configured to:
obtain, during the calibration of the head fly height of the slider using the temperature sensor, a signal indicative of a surface topography of the selected media disk,
wherein the preselected threshold temperature range corresponds to the signal indicative of the surface topography.

22. The system of claim 15, wherein the tester is further configured to:
initialize, prior to scanning the media surface of the selected media disk, the number of media surfaces scanned for the slider to 0.

23. The system of claim 15, wherein the temperature sensor comprises a nano-thermistor stripe sensor.

24. The system of claim 15, wherein the temperature sensor is disposed on an air bearing surface of the slider.

25. The system of claim 15, wherein the temperature sensor is configured to indirectly measure a contamination of the slider.

26. The system of claim 15, wherein the temperature sensor is configured to measure a flying attitude of the slider.

27. The system of claim 15:
wherein the preselected threshold temperature range is in a range from about 1 degree Celsius less than an operating temperature of the temperature sensor to about 1 degree Celsius greater than the operating temperature of the temperature sensor;
wherein the number of the preselected crossing events limit is in a range from about 50 to about 150; and
wherein the media surfaces scanned threshold is in a range from about 900 to about 1100.

28. The system of claim 15, wherein the preselected time period is in a range from about 4 milliseconds to about 8 milliseconds.

\* \* \* \* \*